US005645142A

United States Patent [19]

Kraemer et al.

[11] Patent Number: 5,645,142

[45] Date of Patent: Jul. 8, 1997

[54] WEDGE BRAKING SYSTEM FOR MULTI-STAGE LIFTS

[75] Inventors: Matthew G. Kraemer, Seattle; Richard M. Curtin, Redmond; Paul K. Smith, Kirkland, all of Wash.

[73] Assignee: Genie Industries, Redmond, Wash.

[21] Appl. No.: 228,605

[22] Filed: Apr. 18, 1994

[51] Int. Cl.$^{6}$ .................................. B60T 8/72; B66B 5/12

[52] U.S. Cl. .......................... 187/372; 188/189; 188/136; 187/226; 182/148

[58] Field of Search .................................... 188/82.84, 67, 188/82.1, 82.8, 71.1, 72.7, 135, 136, 139, 166, 180, 189, 181 A; 187/226, 223, 372; 182/141, 148, 62.5, 112, 230

[56] References Cited

U.S. PATENT DOCUMENTS

| | | | |
|---|---|---|---|
| 186,241 | 1/1877 | Fogg | 187/372 |
| 859,718 | 3/1907 | Abbott | 187/372 |
| 3,752,261 | 8/1973 | Bushnell, Jr. | 182/141 X |
| 4,015,686 | 4/1977 | Bushnell, Jr. | 182/148 |

FOREIGN PATENT DOCUMENTS

| | | | |
|---|---|---|---|
| 541611 | 7/1922 | France | 187/84 |

*Primary Examiner*—Peter M. Poon
*Attorney, Agent, or Firm*—Seed and Berry LLP

[57] ABSTRACT

Apparatus for braking relative vertical movement between two vertical members includes a ramp mounted on one of the members to oppose a vertical face on the other. If the ramp member accelerates downwardly a wedging roller is wedged between the ramp and the vertical face. This roller is on a slide rod which normally compresses a spring carried at the bottom of the ramp, but downward acceleration on the ramp results in expansion of the spring and movement of the wedging roller into wedging position to stop the acceleration.

13 Claims, 7 Drawing Sheets

WEDGE BRAKING SYSTEM FOR MULTI-STAGE LIFTS

TECHNICAL FIELD

The present invention relates to a braking system for stopping relative movement between the stages of a multi-stage lift in case of failure of the lifting mechanism such, for example, failure of a cable when the lifting mechanism is a reeving system.

BACKGROUND OF THE INVENTION

U.S. Pat. No. 4,015,686 discloses a multi-stage lift which has been in commercial production for many years. In this lift the stages comprise like extruded aluminum mast sections which interfit in front to back relation and are separated in the front to back direction by guide rollers. The lift stages are elevated by operation of a reeving system including a cable between a rear winch and a front carriage which passes over top and bottom pulleys in each extensible stage, a top pulley on the back stationary stage, and a pulley on the carriage. The carriage pulley and the bottom pulleys on the extensible stages are spring-biased to move downwardly in case of cable failure. Such downward movement swings a locking pawl into operating position into an adjacent recess provided by a locking channel on the adjoining stage.

The principal object of the present invention is to provide an effective braking system of simpler and more economical construction.

SUMMARY OF THE INVENTION

The braking system of this invention operates by the wedging of knurled rollers between a sloped face and a vertical face diverging downwardly from adjoining mast sections. The sloped face is provided by a ramp member from the lower end of which a flange projects toward the vertical face. A slide rod freely extends through a vertical opening in this flange and has a pair of the knurled rollers mounted adjacent its upper end at opposite sides. The slide rod extends through a compression spring seated on the flange. Normally, this spring is engaged at the top by a stop pin on the slide rod and is compressed by the combined weight of the rod and rollers. However, if the mast stage on which the ramp member is mounted accelerates downwardly relative to the adjoining stage the compression spring responsively expands and causes the wedging rollers to occupy a wedging position stopping further downward movement of the ramp member and associated mast section relative to the adjoining stage.

DETAILED DESCRIPTION OF THE INVENTION

Figure 1:
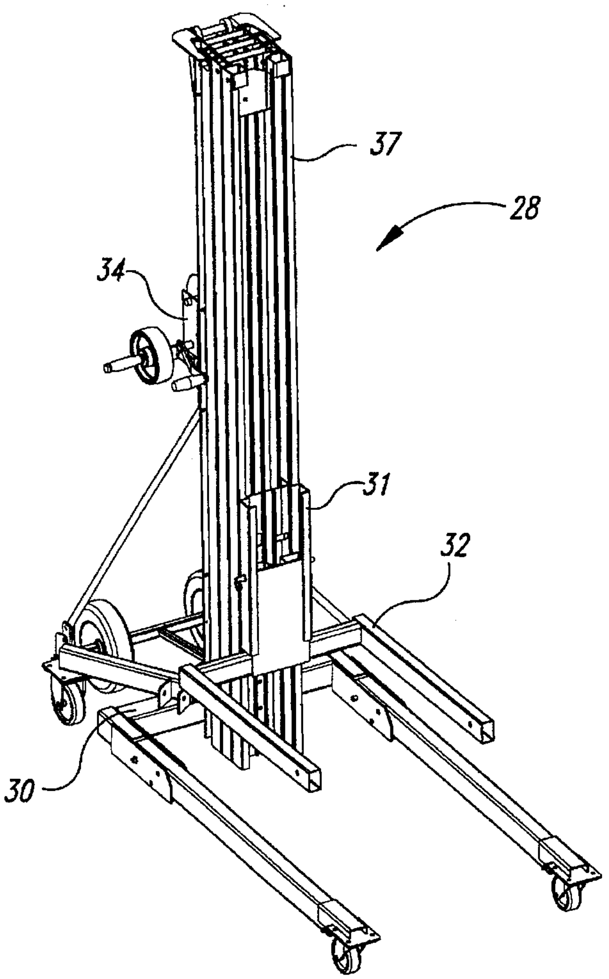
FIG. 1 is a perspective view of a portable lift to which the invention has been applied.

The braking system of the present invention is shown operating in an improved portable multi-stage lift 28 to be now described having a mobile base assembly 30. This improved lift is not part of the present invention.

The lift has a front carriage section 31 which can carry a load support 32. At the rear the lift has a winch 34 which may be manually operated or can be a motor driven unit. The winch is mounted on the rear of a back stationary mast stage 35. For purposes of example two extensible mast stages 36–37 have been illustrated between the back stage 35 and the carriage 31.

Figure 2:
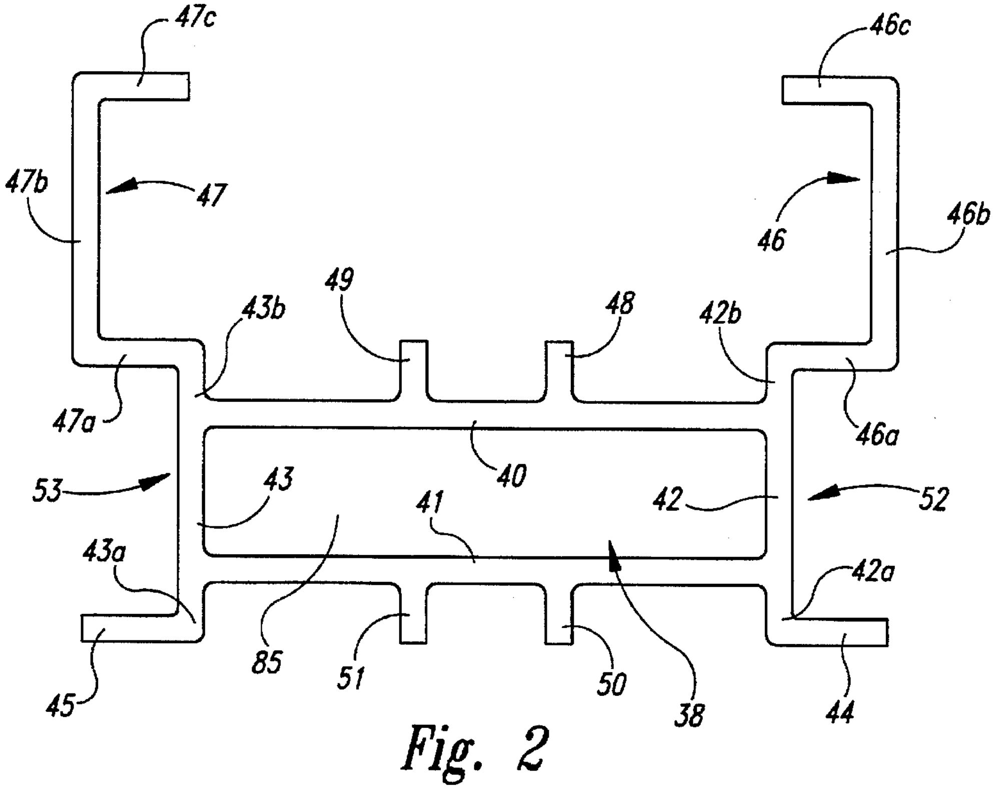
FIG. 2 is an end view of an extruded aluminum section made in accordance with the invention.

The mast stages 35–37 and carriage 31 are preferably identical in cross-section and comprise a length of extruded aluminum bar stock whose cross-section is shown in FIG. 2. It will be seen that each mast stage has a central hollow column 38 of generally rectangular cross-section having front and back walls 40–41 and a pair of right and left side walls 42–43 extending therebetween. At the rear of the column 38 the side walls 42–43 continue rearwardly at 42*a*–43*a* and join back laterally extending flanges 44–45. At the front of the column the side walls 42–43 continue forwardly at 42*b*, 43*b* and join right and left inturned front channels 46–47 comprising outwardly extending central flanges 46*a*–47*a*, outside sections 46*b*–47*b*, and inturned front flanges 46*c*–47*c*. The front and rear walls 40–41 have respectively, a forwardly projecting pair of stub flanges 48–49 and a rearwardly projecting pair of stub flanges 50–51. The front stub flanges 48–49 are slightly offset to the right relative to the rear stub flanges 50–51. It will be noted that the central flanges 46*a*–47*a* together with the walls 42–43 and back flanges 44–45 define right and left outwardly facing back channels 52–53.

Figure 4:
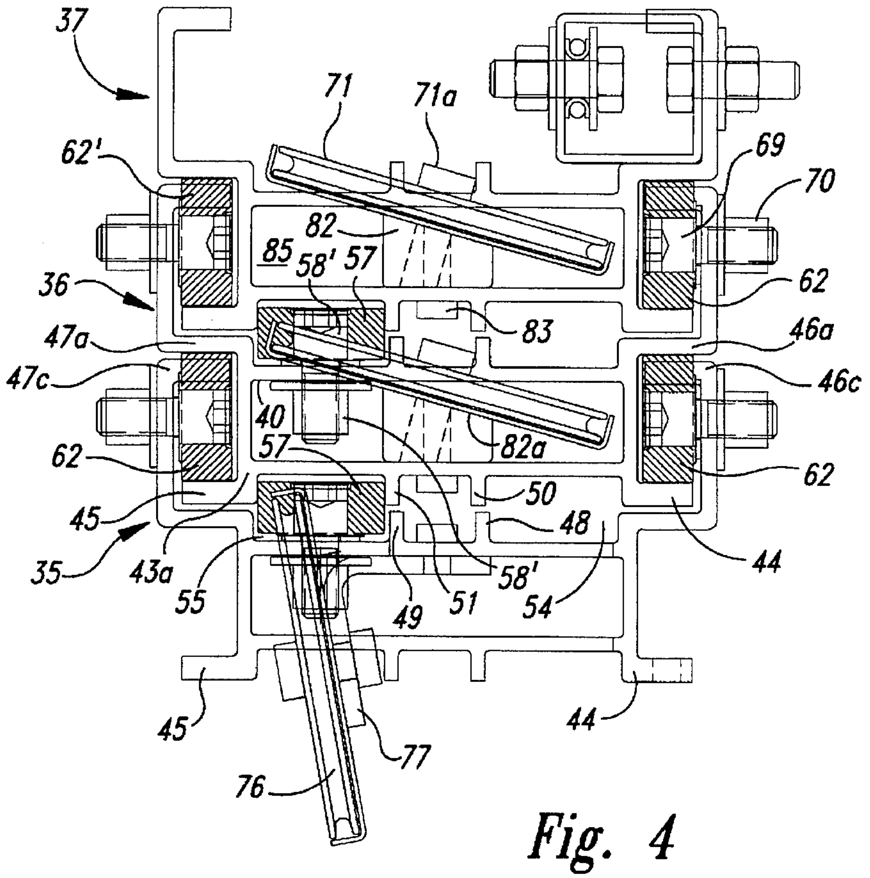
FIG. 4 is a top view of the mast stages without the carriage.
Figure 5:
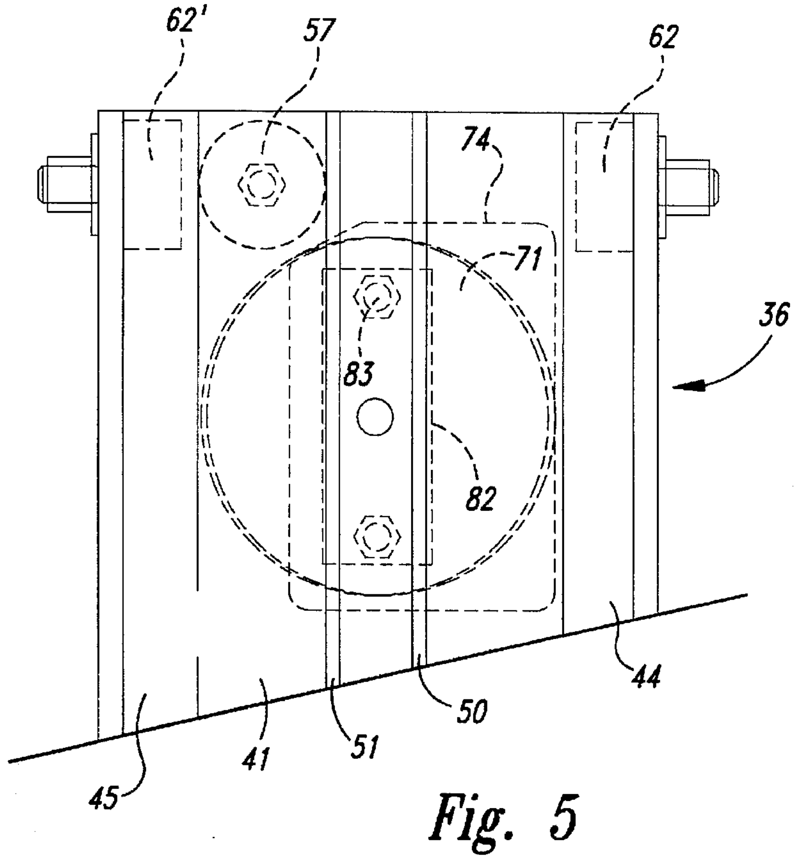
FIG. 5 is a fragmentary elevational view of the back of the front extensible mast stage and showing the position of the related side-to-side roller in broken lines which is mounted directly behind.
Figure 6:
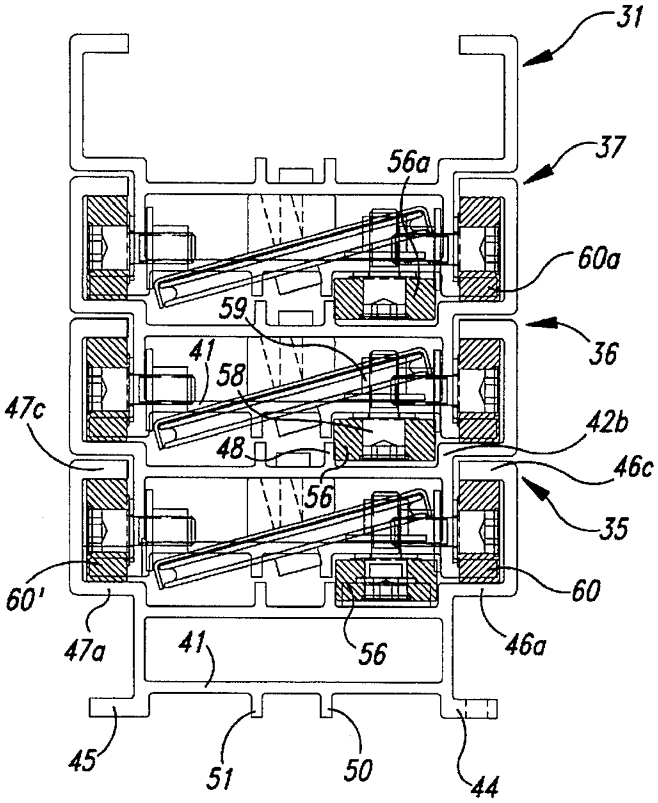
FIG. 6 is a transverse sectional view through the mast stages and carriage when the carriage is in a lowered position and without section lines on the mast extrusions.
Figure 9:
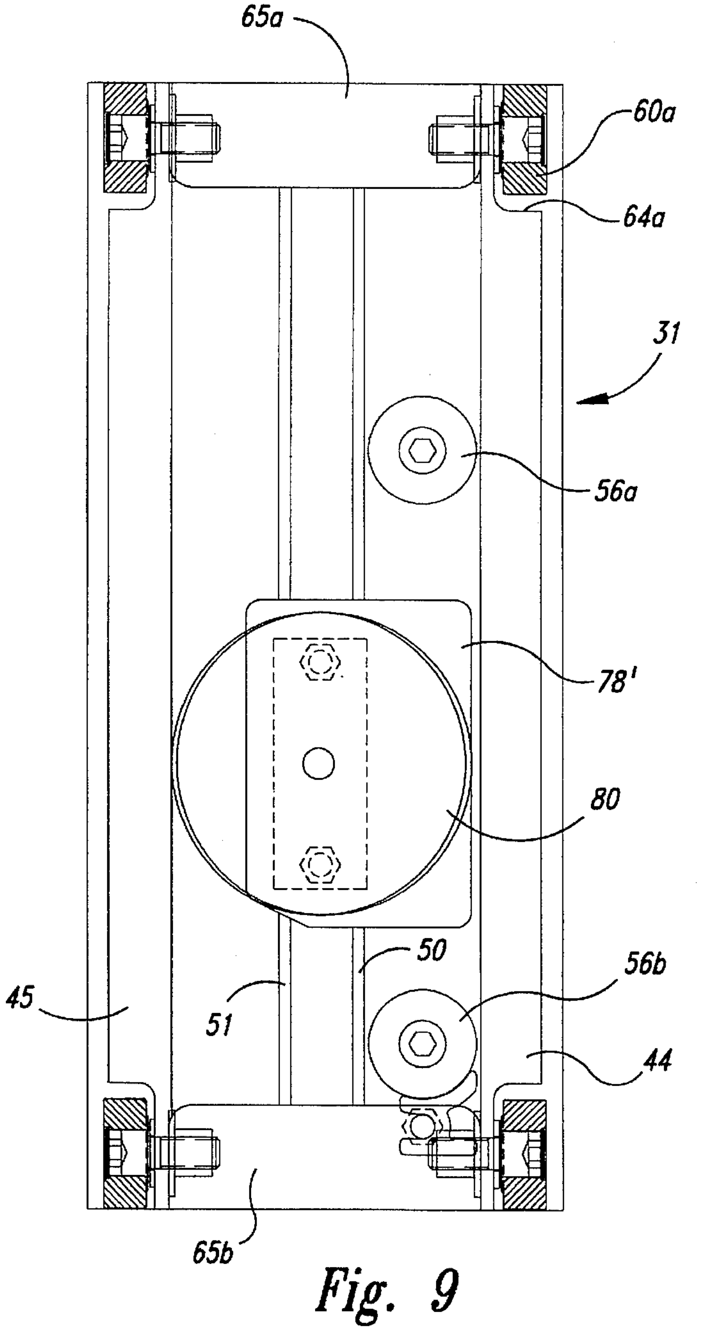
FIG. 9 is a rear elevational view of the carriage.

Directing attention to FIG. 4, the described mast stage configuration enables the front inturned channels 46–47 of one mast stage to interfit with the back out-turned channels 52–53 of a second mast stage with the back flanges 44–45 of the front stage facing the front of the central flanges 46*a*–47*a* of the back stage, and the front flanges 46*c*–47*c* of the back stage facing the rear of the central flanges 46*a*–47*a* of the front stage. When mast stages 35–37 are interfitted as described, the rear stub flanges 50–51 of the front mast stage are opposite the front stub flanges 48–49 of the adjacent rear mast stage, but slightly offset to the left. As a result the interfitting mast stages provide therebetween right and left longitudinal passages 54–55. These passages house right (FIG. 6) and left (FIG. 4) side-to-side rollers 56–57 on shaft bolts 58 passing through the back wall 41 of the front interfitting mast stage and the front wall 40 of the rear interfitting mast stage, respectively, to receive a washer and retaining nut 59. Each right side-to-side roller 56 tracks on the right face of the right front stub flange 48 of the rear interfitting mast stage, or the left face of the right wall extension 42b of the rear interfitting mast stage as can be seen in FIG. 6 by reference to the roller 56 mounted on stage 37. Similarly, each left side-to-side roller 57 tracks on the left face of the left rear stub flange 51 of the front interfitting mast stage, or the right face of the left wall extension 43a of the front interfitting mast stage as can be seen in FIG. 4 by reference to the roller 57 mounted on stage 35. In the illustrated lift having a stationary mast stage 35, two extensible mast stages 36–37 and a carriage 31, four right side-to-side rollers 56 are provided, namely, one between mast stages 35–36, another between stages 36–37, and the remaining two between the carriage 31 and front stage 37. Two left side-to-side rollers 57 are provided, one between mast stages 35–36, and the other between stages 36–37. The right rollers 56 between the mast stages 35–36 and 36–37 are positioned near the bottom thereof and the positioning of those on the carriage (designated 56a–56b) is shown in FIG. 9. The two left side-by-side rollers to keep the mast stages and carriage laterally aligned is by way of example only.

Figure 7:
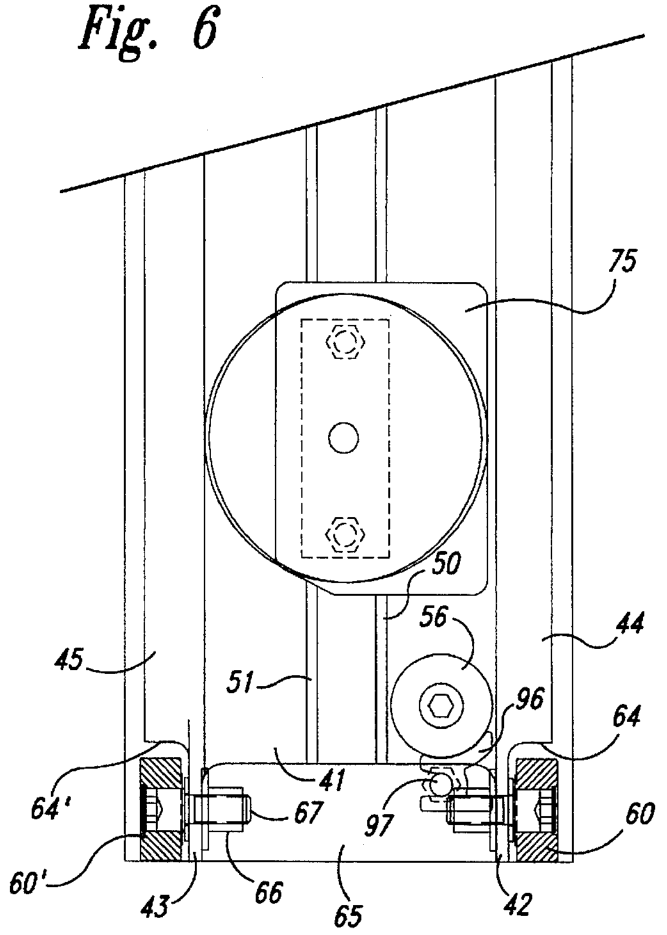
FIG. 7 is a fragmentary rear elevational view of the rear extensible mast stage.
Figure 8:
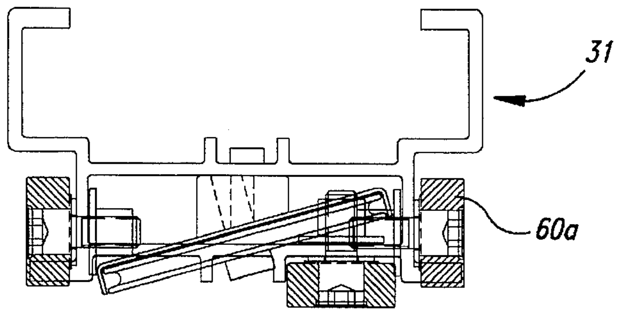
FIG. 8 is a top plan view of the carriage.

Front to back alignment of the mast stages is provided by bottom front-to-back pairs of rollers 60—60' on mast stages 35, 36 and 37, and top front-to-back pairs of rollers 62—62' on stages 35–36. Cutouts 64—64' are provided at the bottom of the back flanges 44–45 of the mast stages, and a central bottom cutout 65 is provided in the back wall 41 and back stub flanges 50–51 of the mast stages as seen in FIG. 7. These cutouts 65 provide operating space for the rear portion of the bottom rollers 60—60' and access to washers and nuts 66 on the bolt shafts 67 for these rollers passing through the right and left walls 42–43. Space for the front portion of the top rollers 62—62' is provided by top cutouts 68 in the front flanges 46c–47c. The shaft bolts 69 for the top rollers 62—62' pass outwardly through the outside sections 46b–47b to receive washers and nuts 70. With the described arrangement of front-to-back rollers, the bottom rollers 60—60' track on the rear face of the front inturned flanges 46c–47c or the front face of the intermediate flanges 46a–47a of the rear mast stage of interfitting mast stages. Similarly, the top front-to-back rollers 62—62' track on the front face of the rear out-turned flanges 44–45 or the back face of the intermediate flanges 46a–47a of the front stage of interfitting mast stages. As shown in FIG. 9, the carriage 31 has front-to-back rollers 60a adjacent its four corners mounted in the same manner as the rollers 60—60'. Corner cutouts 64a and top and bottom central cutouts 65a–b are provided like the cutouts 64 and 65 in the mast sections.

Figure 3:
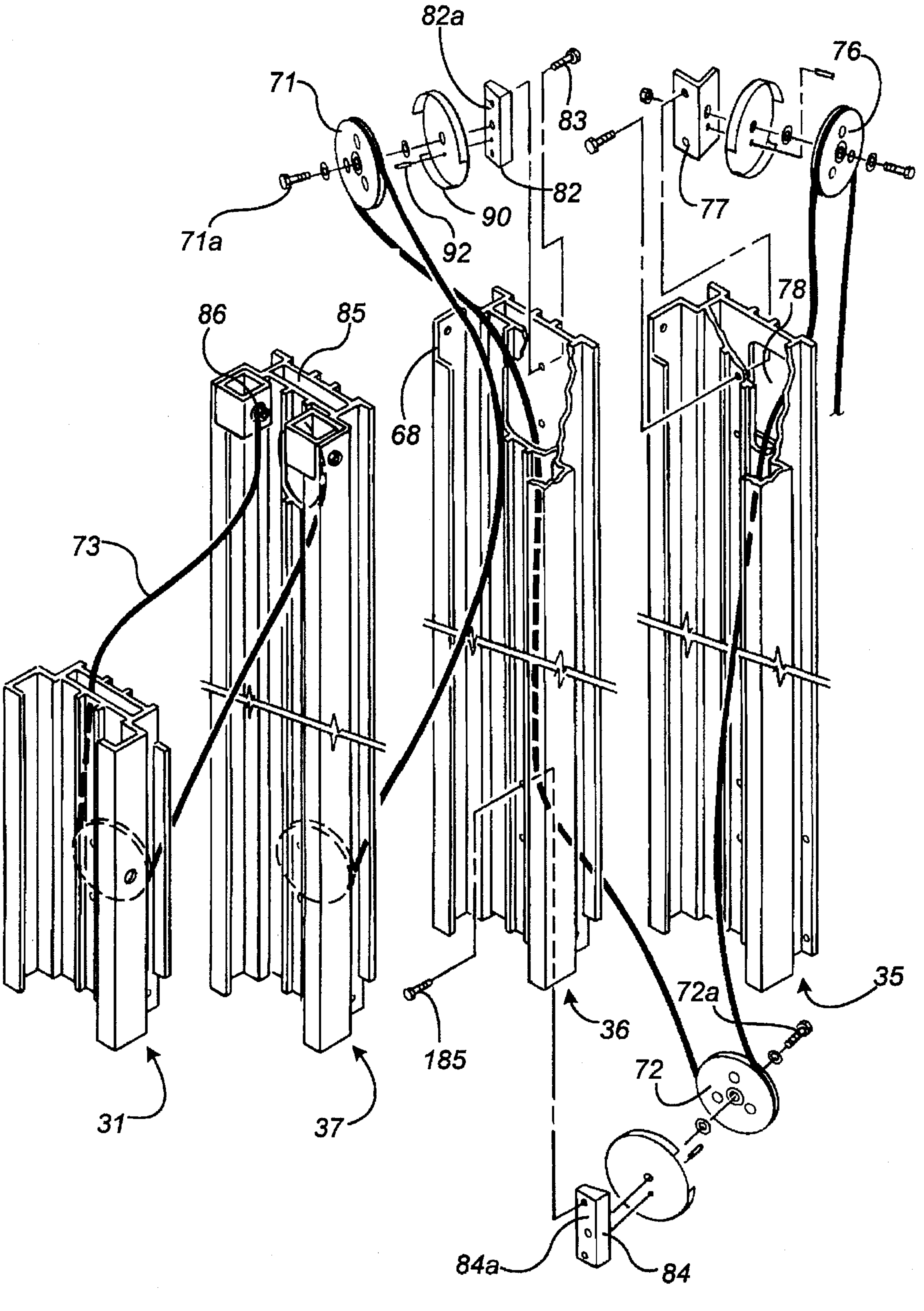
FIG. 3 is an exploded view illustrating the reeving arrangement for the carriage and mast stages of the lift.

Referring to FIG. 3, each of the extensible mast stages 36–37 has a top 'pulley 71 and a bottom pulley 72 adjacent its ends for receiving a cable 73. from the winch 34. Each top pulley 71 extends through a cutout 74 in the front wall 40 of the respective mast stage, and each bottom pulley 72 extends through a cutout 75 in the back wall 41 of the respective mast stage. The rear stationary mast stage 35 has a single upper pulley 76 journal-mounted on an angle bracket 77 mounted on its front wall and extending through registering cutouts 78 in the front and back walls thereof. The carriage 31 has a pulley 80 extending through a cutout 78' in its back wall. The top pulleys 71 are journaled on shaft bolts 71a mounted in blocks 82 fixed by bolts at 83 to the back wall 41 of the respective mast stage, and the lower pulleys 72 are journaled on shaft bolts 72a passing through blocks 84 fixed by bolts 185 to the front wall 40 of the respective mast stage.

The blocks 82, 84 have front beveled faces 82a, 84a, respectively, angled so that the respective pulleys are tilted in an upright plane. The two upper pulleys 71 are tilted such as to extend rearward into the right portion of the center passage 85 along the column portion 38 of the respective mast stage from the left passage 55 in front of the stage. The two lower pulleys 72 and the carriage pulley 80, on the other hand, angle rearward from the right portion of the central passage 85 to the left passage 55 which is next to the rear. This positions the pulleys such that the cable 73 extends from a stop 86 on the upper end of the front mast stage 37, travels under the carriage pulley 80, then over the top pulley 71 and under the bottom pulley 72 of the extensible mast stages 37, 36 progressing from front to back, then travels over the top pulley 76 on the back stationary mast stage 35 and down to the winch 34.

It is preferred to provide the pulleys 71, 72, 76 and 80 with guards 90 (FIG. 3) which are sleeved on the shaft bolts which extend through the pulleys into the tapered blocks 82, 84. Dowel pins 92 extending from the blocks 82, 84 through openings in the pulleys keep the guards 90 properly oriented. Bottom stops 96 held by bolts 97 are provided on the mast stages 35–37 for engagement by the bottom side-to-side rollers on the carriage 31 and stages 36–37. Stops are also provided to engage the top rollers to limit upward travel of the carriage 31 and extensible stages 36–37.

From the foregoing description it is seen that the carriage 31 and the extensible mast sections 36–37 are roller guided front-to-back and side-to-side for smooth up and down travel. When cable is taken up on the winch 34, first the carriage 31 travels up the mast stage 37. Then the front extensible stage 37 is raised following which the next stage 36 is raised. It will be apparent that additional extensible mast sections can be added which duplicate stage 36.

The braking system of the present invention is adapted to stop downward travel of the carriage 31 and extensible mast stages 36–37 in case of a lift failure such, for example, as a failure of the cable 72. The system will first be described without reference to the lift 28. It includes a guide unit 100, a slide unit 102 freely passing through a vertical slide opening 103 in the guide unit, a wedging unit 104 mounted on the upper end of the slide unit, and a compression spring 106 seated on a washer 107 on the guide unit.

The slide unit 102 comprises a round slide rod 102a and a stop pin 102b projecting laterally therefrom. At its upper end the rod 102a is necked to present a pair of flat side faces 102c. The guide unit 100 projects as a flange from a ramp member 108 which presents a sloped ramp face 108a with a slope of about five degrees, and is held in place by a screw 110 passing through a countersunk hole at its upper end. An upper washer 109 rests on the spring 106 and is normally engaged by the stop pin 102b. Wedging unit 104 includes a pair of knurled rollers 104a–104b journaled on opposite end portions of an axle pin 104c passing laterally through a hole in the upper necked portion of the slide rod 102a.

By way of example, the slide rod 102a and rollers 104a–104b may be formed from roundbar brass C360 material which has a diameter of 0.438 inches and 1.000 inches, respectively. The rod 102a may be 9.38 inches long and its flat side faces 102c at the upper end may be 0.880 inches long and spaced apart 0.125 inches. The rollers 104a–104b may be 0.250 inches thick. Slide opening 103 in the guide can have a diameter of 0.50 inches, thereby providing a loose sliding tolerance of 0.031 with the slide rod 102a. The ramp member 108 may be formed from extruded aluminum.

The ramp member 108 is adapted to be mounted, for example, on an extensible mast or carriage on a lift in a location in which the sloped face 108a of the ramp member will oppose a vertical face 112 on the adjoining rearward stage, thereby providing a tapered space 113 between the faces 108*a*, 112 which diverges in the downward direction. The wedging unit 104 is located in this tapered space, but normally does not engage the vertical face 112. In the normal condition the stop pin 102*b* engages the upper washer 109 of the compression spring unit, and the combined weight of the slide unit 102 and wedging unit 104 together with the weight of the upper washer 109 is such as to substantially fully compress the spring 106. It is preferred that this combined stationary weight of the moving parts exert a downward force that is about 5% greater than the upward force exerted by the compressed spring 106.

If the ramp member 108 and the member to which it is secured accelerate downward relative to the vertical face 112, the compressed spring 106 expands when its force exceeds the combined downward gravitational force exerted by the slide unit 102, wedging unit 106, and upper washer 109. Consequently, the ramp member 108 lowers relative to the slide unit 102 and continues to do so until the rollers 104*a*–104*b* are wedged between the sloped ramp face 108*a* and the opposing vertical face 112 in the tapered space 113. The resulting wedging action stops further downward movement of the member on which the ramp member is mounted relative to the member presenting the vertical face 112.

Figure 11A:
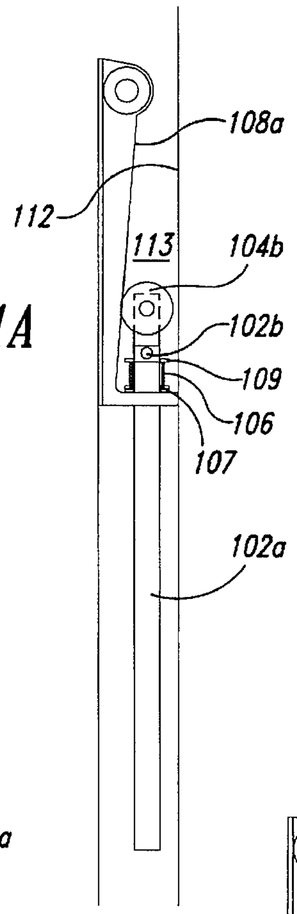
FIGS. 11A, 11B, and 11C are elevational view of the braking system.
Figure 11B:
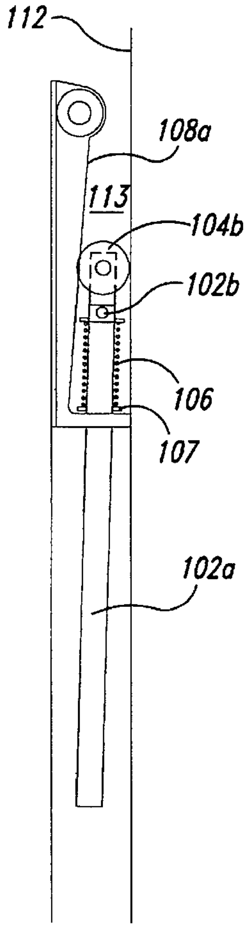
Figure 11C:
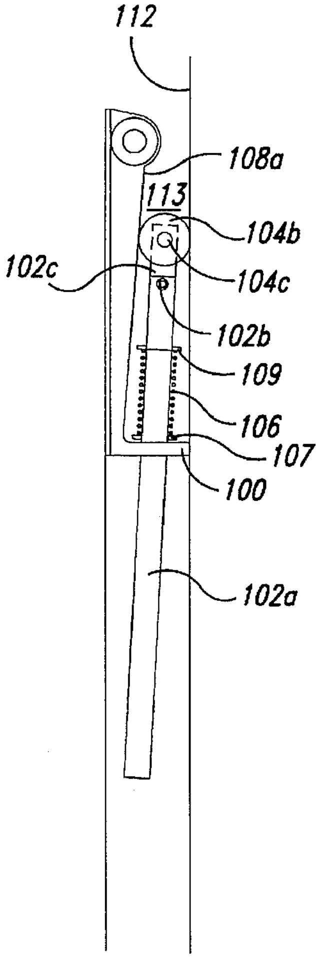

The three frames of FIGS. 11A, 11B and 11C illustrate activation of the braking components. Frame 11A shows the components in normal inactive position whereat the spring 106 is fully compressed. Frame 11B illustrates a downward acceleration condition of the wedging unit 104 resulting in full extension of the spring 106 and the start of contact of the wedging rollers 104*a*–*b* with the ramp surface and opposing vertical face 112 on the non-accelerating member. Frame 11C shows a full braking condition of the components in which the knurled outer peripheral surfaces of the rollers 104*a*–*b* are tightly wedged in locking position between the sloped ramp face and the opposing vertical face.

Figure 10:
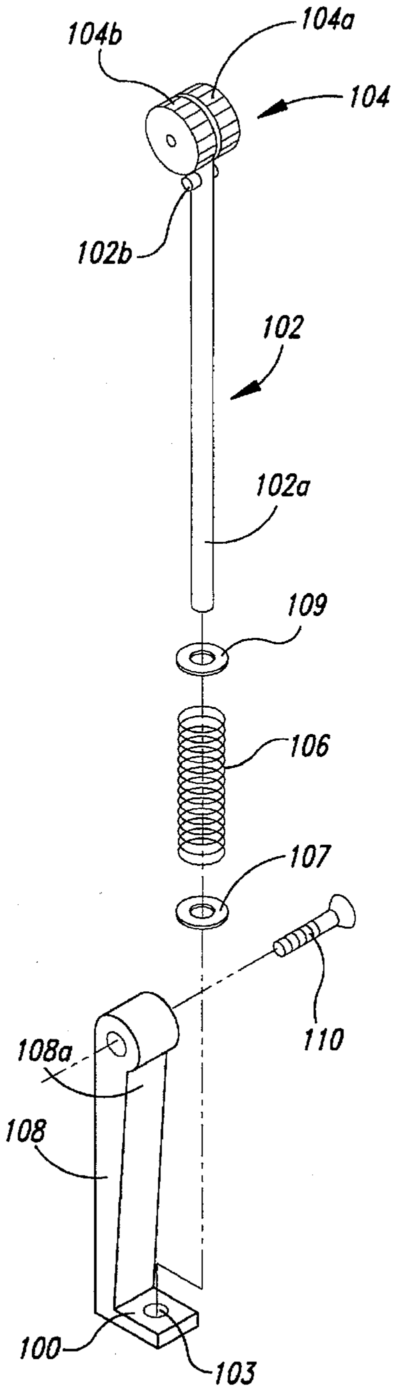
FIG. 10 is an exploded view of the braking system.

In the previously described multi-stage lift the braking system can be mounted, for example, in the passages in which the bottom front-to-back rollers operate by securing the ramp so that its back rests against the front face of the back flange 44 or 45 of the carriage 31 and each extensible mast stage. The ramp will then be opposed by the back face of the front flange 46*c* or 47*c*, respectively, of the next mast stage to the rear which will then becomes the vertical face 112 in the FIG. 10 example discussed above.

Figure 12:
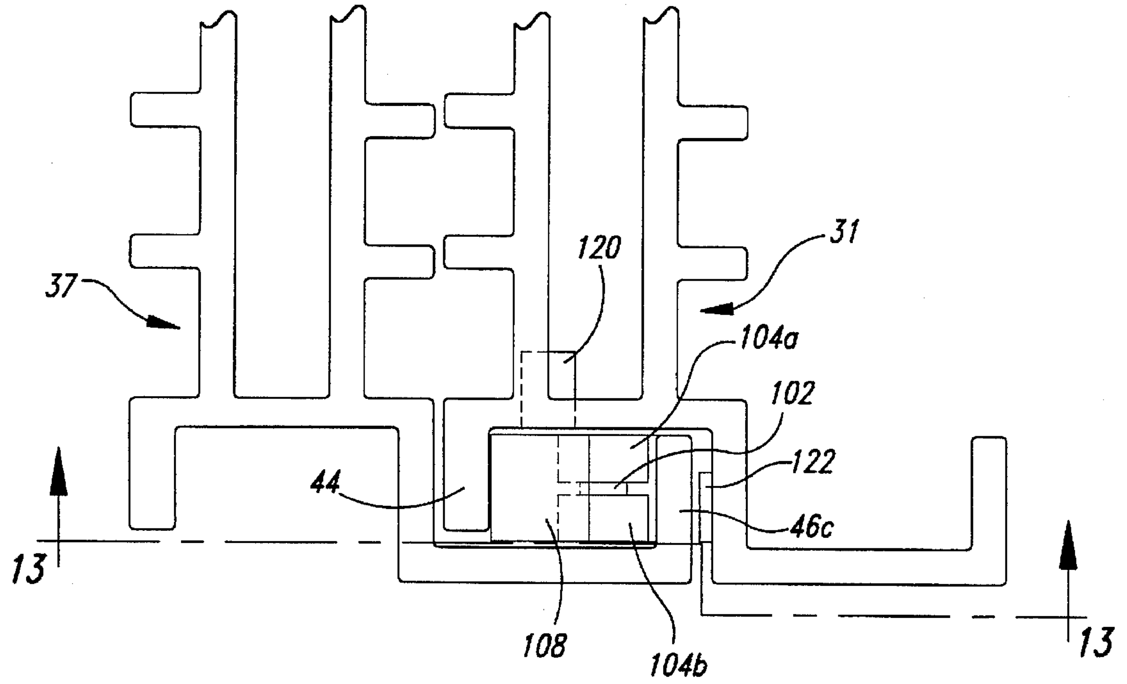
FIG. 12 is a top view showing mounting of the ramp unit of the braking system on the carriage of the multi-stage lift.
Figure 13:
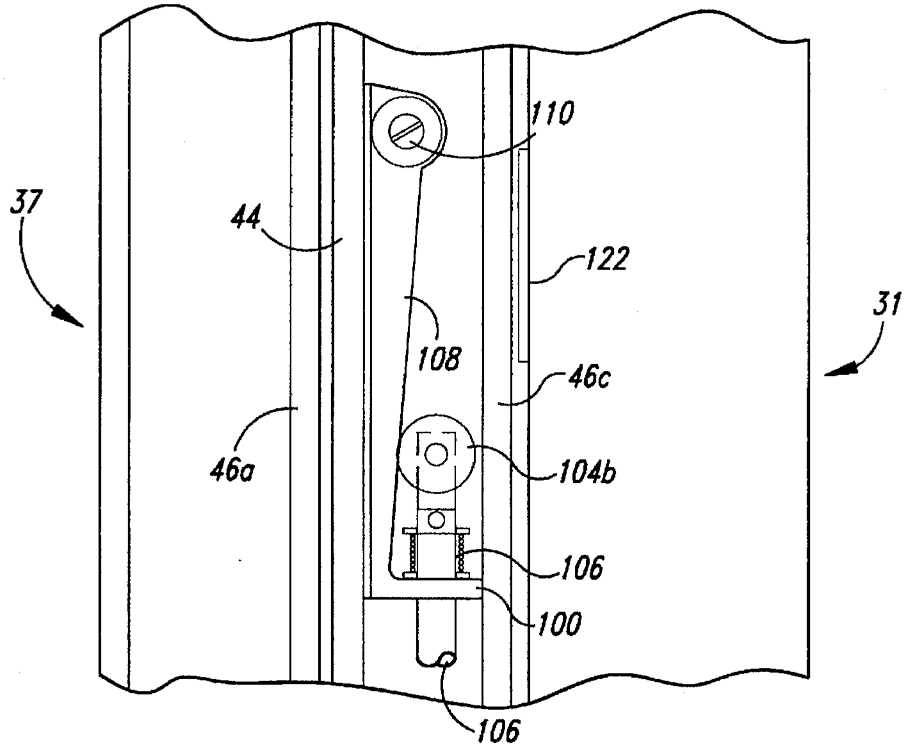
FIG. 13 is a vertical sectional view taken on line 13—13 of FIG. 12.

To anchor the screw 110 for the ramp, a nut insert 120 can be fitted into the carriage extrusion as indicated in FIG. 12 when the brake is mounted on the right side of the carriage 31 for example. When the brake is activated by accelerated fall of the carriage, the rollers 104*a*, 104*b* wedge between the ramp and the back face of the front flange 46*c* of the front mast stage 37. A shim 122 can be provided on the front face of the front flange 46*c* to keep the distance from the ramp 108 forwardly to the flange 46*c* nearly constant. The described safety apparatus can be mounted near the bottom of the respective mast stage so that when the stage is near the top of its upward travel the top of the ramp member 108 will engage an overlying top front-to-back roller on the next mast stage to the back and thereby serve as a stop to limit upward travel.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A braking system for first and second vertically moveable members having opposed wedging faces diverging apart in the downward direction;
   - a guide element projecting from one of said members and providing a vertical guide opening aligned with a tapered space between said wedging faces;
   - a vertical slide unit slidably mounted in said guide opening;
   - a wedging unit on the upper end of said guide element in said tapered space;
   - a compression spring seated on said guide element and normally compressed by engagement of the top of said spring by said slide unit; and
   - the combined weight of said slide unit and wedging unit being such as to permit said spring to expand responsive to downward acceleration of one of said members relative to the other member, thereby causing said wedging unit to seat between said wedging faces and stop further relative vertical movement between said members.

2. A braking system according to claim 1 in which said wedging unit comprises a knurled roller mounted on a pin extending into said slide unit.

3. A combination according to claim 2 in which said slide unit has a spring engaging stop below said roller for engaging the top of said spring unit.

4. A combination braking system and multi-stage lift comprising:
   - first and second adjoining mast stages, the first mast stage being arranged to extend to move upwardly relative to the second mast stage, said mast stages presenting two longitudinal opposed faces spaced apart and diverging in a downward direction, thereby providing a tapered space between said mast stages which widens in the downward direction;
   - a guide unit extending from one of said mast stages toward the other mast stage and presenting a vertical guide opening;
   - a slide unit arranged to slide vertically through said guide opening and having a wedging unit at its upper end located in said tapered space; and
   - a compression spring unit seated on said guide unit and normally engaged on the top by said slide unit at a location beneath said wedging unit, said spring unit being normally compressed by the combined weight of the slide unit and wedging unit such that normally said wedging unit is not wedged between said opposed faces and such that a condition of downward acceleration of said first stage relative to said second stage results in raising of said wedging unit by said spring relative to said guide unit into wedging position between said opposed diverging faces to thereby stop further downward movement of said first stage relative to said second stage.

5. A combination according to claim 4 in which said wedging unit comprises a roller and an axle pin passing through said roller and slide unit, said roller having an outer diameter of a dimension between the minimum and maximum distance between said diverging opposed faces.

6. A combination according to claim 5 in which said roller is knurled on its outer annular peripheral surface.

7. A combination according to claim 4 in which said wedging unit comprises a pair of knurled rollers on a pin extending through an upper end portion of said slide unit.

8. A combination according to claim 4 in which said slide unit includes a stop arranged to normally engage the top of said compression spring unit, and to raise above said compression spring unit when said condition of downward acceleration exists.

9. A combination according to claim 4 in which said first stage is a carriage and said second stage is an extensible stage.

10. A combination according to claim 4 in which said stages are both extensible stages.

11. A combination according to claim 4 in which said first stage is an extensible stage and said second stage is stationary.

12. A combination according to claim 4 in which said guide unit projects from a mounting member mounted on said first stage and provides one of said diverging faces.

13. A combination according to claim 12 in which the diverging face on said second stage is vertical.

* * * * *